United States Patent [19]

Boyer

[11] Patent Number: 5,533,232
[45] Date of Patent: Jul. 9, 1996

[54] HAND LEVER ASSEMBLY

[75] Inventor: David C. Boyer, Millersburg, Pa.

[73] Assignee: Alvord-Polk, Inc., Millersburg, Pa.

[21] Appl. No.: 491,737

[22] Filed: Jun. 19, 1995

[51] Int. Cl.⁶ .................................................. A47B 95/02
[52] U.S. Cl. .............................. 16/114 R; 16/2; 403/325; 403/17; 81/58.3
[58] Field of Search ........................... 16/114 R, 111 R, 16/DIG. 19, DIG. 24, DIG. 30, 2, 3; 403/325, 322, 321, 17, 19; 81/58.3, 58.4, 58

[56] References Cited

U.S. PATENT DOCUMENTS

| | | | |
|---|---|---|---|
| 2,452,742 | 11/1948 | Franzene | 74/548 |
| 2,603,325 | 7/1952 | Pickard | 192/67 |
| 2,607,253 | 8/1952 | Gearhart | 81/58 |
| 2,862,746 | 12/1958 | Deliso | 287/126 |
| 3,222,884 | 12/1965 | Lyle | 64/1 |
| 3,235,296 | 2/1966 | Day | 287/58 |
| 3,386,127 | 6/1968 | Hitzeroth et al. | 16/121 |
| 3,396,604 | 8/1968 | Samuels et al. | 74/548 |
| 3,433,512 | 3/1969 | Kraft | 287/52 |
| 3,658,086 | 4/1972 | Hart | 137/378 |
| 3,865,500 | 2/1975 | Newell | 403/359 |
| 3,955,438 | 5/1976 | Zakrewski | 74/480 |
| 4,132,129 | 1/1979 | Pratt | 74/553 |
| 4,161,891 | 7/1979 | Bossert | 74/548 |
| 4,210,185 | 7/1980 | Acevedo | 145/76 |
| 4,220,054 | 9/1980 | Kuhlman | 74/545 |
| 4,249,435 | 2/1981 | Villeneuve et al. | 81/477 |
| 4,460,204 | 7/1984 | Olsen | 292/356 |
| 4,598,614 | 7/1986 | Kipp | 81/58 |
| 4,616,673 | 10/1986 | Bondar | 137/315 |
| 4,730,509 | 3/1988 | Hornady | 74/501 |
| 4,779,305 | 10/1988 | Gorsek | 16/121 |
| 4,783,885 | 11/1988 | Bory | 16/114 |
| 4,796,329 | 1/1989 | Bory | 16/121 |
| 4,799,407 | 1/1989 | Miyamoto | 81/58 |
| 4,929,113 | 5/1990 | Sheu | 403/157 |
| 4,972,545 | 11/1990 | Ozagir et al. | 16/114 |
| 5,025,826 | 6/1991 | Schoepe et al. | 137/315 |
| 5,031,657 | 7/1991 | Stairs | 137/327 |
| 5,048,365 | 9/1991 | Webb | 74/553 |
| 5,093,959 | 3/1992 | McTargett et al. | 16/121 |
| 5,095,781 | 3/1992 | Blake et al. | 81/58 |
| 5,337,450 | 8/1994 | Martin | 16/114 |
| 5,371,919 | 12/1994 | Winkler | 16/114 |
| 5,394,594 | 3/1995 | Duran | 24/453 |

FOREIGN PATENT DOCUMENTS

| | | |
|---|---|---|
| 7618755 | 10/1976 | Germany . |
| 2526971 | 12/1976 | Germany . |
| 51-89965 | 7/1976 | Japan . |
| 184416 | 8/1922 | United Kingdom . |

*Primary Examiner*—Chuck Y. Mah
*Attorney, Agent, or Firm*—Thomas Hooker

[57] ABSTRACT

A hand lever assembly including a plastic handle body molded around a metal insert for rotation of a rotary member such as an axle, spindle, or the like. The upper surface of the insert has a high point and a low point. The upper surface is further dived into arc surfaces, one extending clockwise from the low point to the high point and the other extending counterclockwise from the low point to the high point. The molded plastic body engages the sections of the insert upper surface. Torque applied to the handle body is transferred to the insert through the engaged arc sections of the upper surface.

15 Claims, 2 Drawing Sheets

HAND LEVER ASSEMBLY

FIELD OF THE INVENTION

This invention relates to a hand lever assembly for rotating a rotary member such as a spindle, stud, axle, or the like.

DESCRIPTION OF THE PRIOR ART

Hand lever assemblies are widely used and known in the clamping and fastener art. These assemblies are used when frequent rotations of a rotary member must be preformed manually. For example, the hand lever assemblies are often used to actuate industrial equipment such as mechanical clamps.

Originally, hand levers were fabricated entirely from metal. For various reasons, including cost and weight, hand levers are now fabricated from synthetic plastic material. Plastic hand levers are, however, softer than their metal counterparts. If a softer hand lever is attached directly to the rotary member, the rotative resistance presented by the rotary member deforms the relatively soft plastic of the hand lever when torque is applied to the hand lever. Once a plastic hand lever is deformed, the hand lever may not be able to rotate the rotary member.

To solve this problem, metallic inserts are molded into plastic bodies forming hand lever assemblies including a plastic handle body and a metal insert. Strong metal-to-metal connections join the bodies to the rotary members. Since the insert is metal, the insert-rotary member connection surface does not deform under the rotative resistance of the rotatable member. However, the metal insert, when bearing the rotative resistance of the rotatable member, has a tendency to deform the plastic handle body in the same way that the rotatable member deformed an all plastic hand lever.

In conventional hand lever assemblies, the insert-to-handle body interface includes a number of anchoring elements formed in the insert. The anchoring elements may protrude from the insert into the over molded handle body. Alternatively, pockets may be formed in the insert allowing the plastic of the handle body to fill the pockets during over molding. The methods of making the inserts with specially shaped anchoring devices or pockets are relatively complicated and expensive.

SUMMARY OF THE INVENTION

The present invention is an improved hand lever assembly for turning a spindle, axle, or the like. The hand lever assembly includes soft plastic handle body molded on a strong metal insert. The insert is attached to the rotary member so that a rotational force applied to the handle body is transferred through the insert to the rotary member. The hand lever assembly may be disengaged from the rotary member, rotated relative to the rotary member, and re-engaged with the rotary member. In this way, the rotary member may be rotated through a large angle even if space restrictions only allow the handle body to be rotated through a small angle. Alternatively, the hand lever may be attached to the rotary member in a fixed position.

The hand lever assembly of the present invention includes a metal insert that does not require anchoring elements or pockets to form a strong insert-to-handle connection. The insert of the present invention costs less to manufacture than conventional hand lever inserts. Additionally, by providing larger torque transfer surfaces between the handle and insert than in conventional hand lever assemblies, the present invention is believed to be able to transfer a high torque from the handle to the rotary member without deformation of the plastic in the handle.

Other objects and features of the invention will become apparent as the description proceeds, especially when taken in conjunction with the accompanying drawings illustrating the invention, of which there are three sheets and one embodiment.

DESCRIPTION OF THE PREFERRED EMBODIMENT

Figure 1:
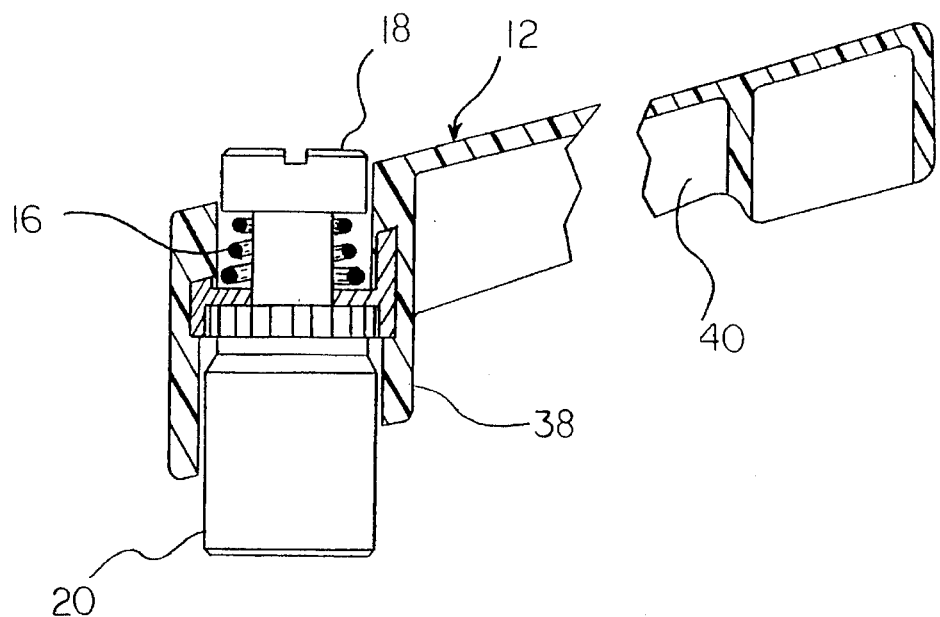
FIG. 1 is a vertical sectional view taken through a handle assembly mounted on a stud.

Hand lever assembly 10 includes a molded plastic handle body 12 and a metal insert 14. Spring 16 and screw 18 attach the assembly to stud 20 as shown in FIG. 1. Spring 16 pushes insert 14 down onto stud 20.

Insert 14 has a cylindrical tubular body 22 of uniform thickness. Lower insert surface 26 lies in a plane which is perpendicular to the longitudinal axis of body 22. The upper end 29 of body 22 is defined by an upwardly facing planar surface 24 having an elliptical shape and a high point 28 located circumferentially 180 degrees across the body from low point 30.

Figures 2, 3:
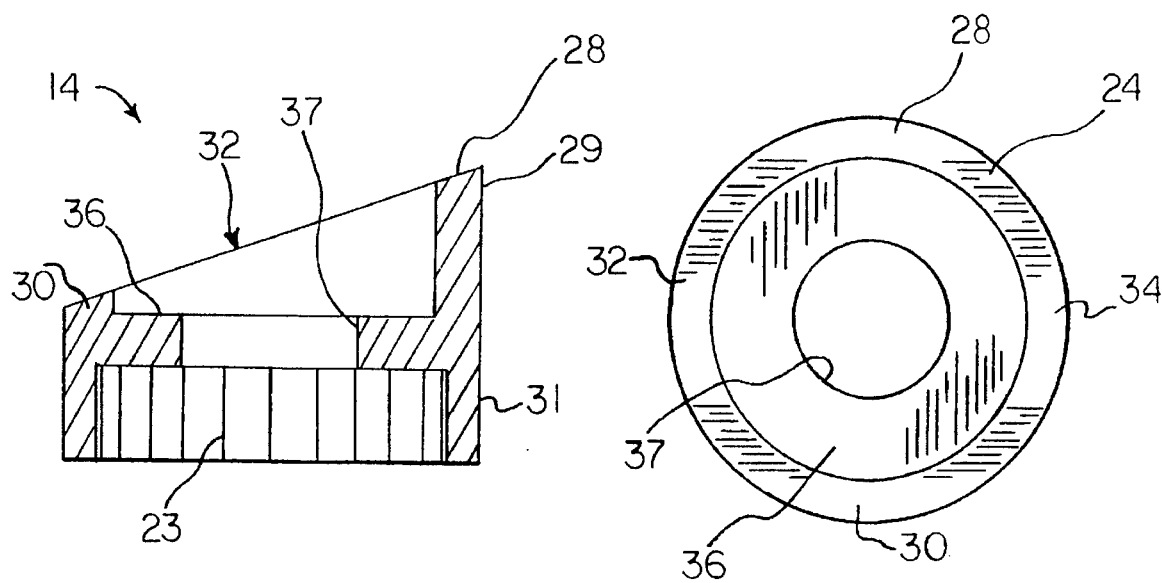
FIG. 2 is an enlarged sectional view taken through a metal insert.
FIGS. 3 and 4 are top and bottom views of the insert, respectively.
Figure 6:
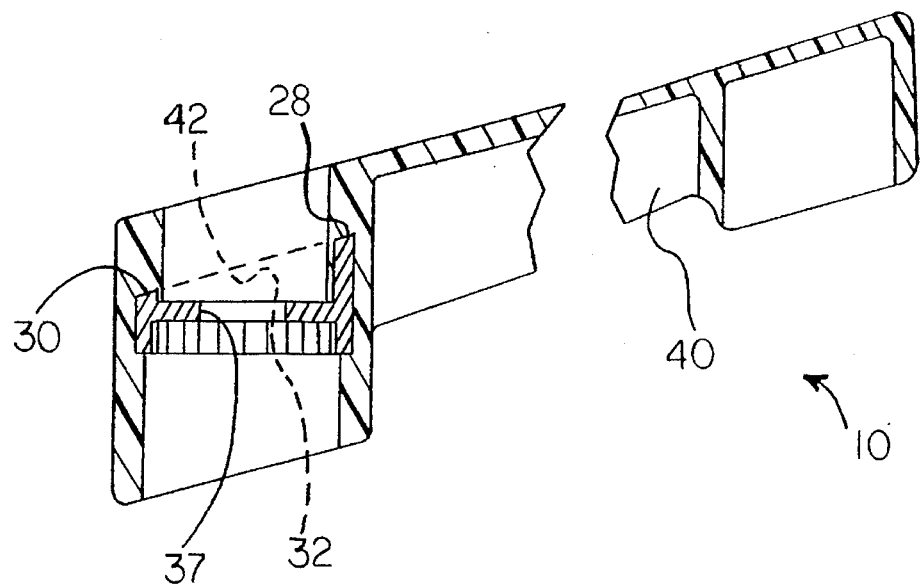
FIG. 6 is a sectional view of the hand lever assembly removed from the stud.
Figure 5:
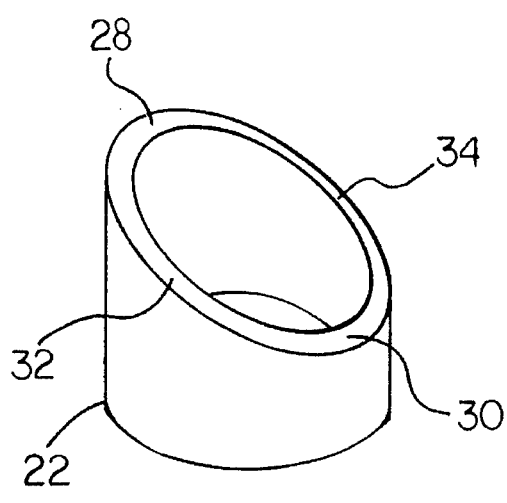
FIG. 5 is a prospective view of the insert.
Figure 4:
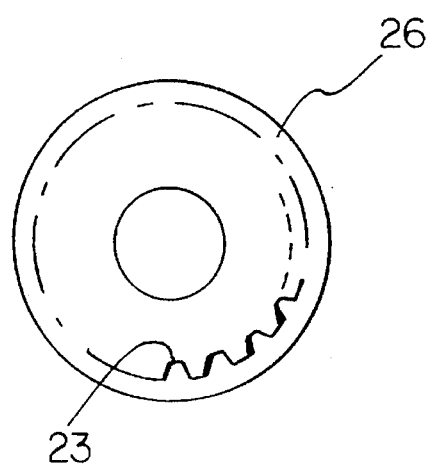

Upper insert surface 24 lies in a plane oriented at a 70 degree angle relative to the axis of body 22. Upper insert surface 24 is divided into a first arc surface 32 and a second arc surface 34. The first arc surface 32 extends clockwise around upper insert surface 24 from low point 30 to high point 28. The second arc surface 34 extends counterclockwise around upper insert surface 24 from low point 30 to high point 28. See FIG. 3.

A plurality of inward facing gear teeth 23 spaced around the inner surface of wall 22 at the lower end 31 of insert body 22. The gear teeth 23 are designed to engage the complementary external gear teeth [not illustrated] on the upper end of stud 20. Annular shelf 36 is provided in body 22 above teeth 23. The shelf lies in a plane normal to the longitudinal axis of insert 14. Hole 37 at the center of shelf 36 allows the shank of screw 18 to pass through the hollow interior of the insert 14 from the upper portion of hand lever assembly 10 to stud 20.

Plastic body 12 is molded on insert 14 and includes a cylindrical base 38 surrounding the insert and a grip 40. Grip 40 extends radially outwardly from the cylindrical base 38. Grip 40 also extends upwardly from a plane normal to the longitudinal axis of cylindrical base 38 at a 20 degree angle. Cylindrical base 38 is molded around the insert and overlies the outer surface of body 22, lower insert surface 26, and upper insert surface 24 including first insert arc surface 32 and second insert arc surface 34. High point 28 and low point 30 are aligned on the axis of grip 40. The plastic base 38 includes a clockwise drive surface 42 engaging arc surface 32 and a counterclockwise drive surface [not illustrated] engaging arc surface 34.

As a clockwise torque is applied to the grip 40 of a hand lever assembly 10 mounted on stud 20, the clockwise drive surface 42 of base 38 moves arc surface 32 and rotates the insert 14 and engaged stud 20 clockwise. Counterclockwise torque applied to the grip 40 of hand lever assembly 10 mounted on stud 20 likewise rotates the stud counterclockwise through the counterclockwise drive surface and arc surface 34. As described, torque may be applied to a handle body in either direction and is transferred to the insert and stud through a large area and reliable drive connection between the handle body and one of the arc surfaces. The large area drive connections are highly reliable and transmit torque from the handle to the insert and stud without deformation of the relatively soft handle plastic.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A handle lever assembly for turning a rotary member, such as a spindle, axle or the like about an axis, the assembly comprising,
   A) a metal insert having a generally cylindrical tubular body with an upper portion and a lower portion, the lower portion of the insert having a plurality of regularly spaced teeth for engaging complementary teeth on a rotary member, the upper portion defining an upper surface of the insert including a high point, a low point, a first surface extending around the body clockwise from the low point to the high point, and a second surface extending counterclockwise around the body from the low point to the high point, such surfaces each including a torque transfer surface; and
   B) a plastic handle body molded around the insert, the handle body including a grip and a cylindrical base, the cylindrical base surrounding the insert body and including drive surfaces engaging the torque surfaces of the insert.

2. A handle lever assembly as described in claim 1 wherein the upper surface of the metal insert is planar and generally elliptical, and the high and low points are opposed across the insert body.

3. A handle level assembly as described in claim 2 wherein said grip of the handle body extends radially from the cylindrical base aligned with the high and low points of the tubular body.

4. A handle lever assembly as described in claim 3 where the grip angles up from the cylindrical base parallel to the plane of the upper surface.

5. A handle lever assembly for turning a member about an axis, the assembly comprising;
   A) a metal insert having a hollow body with an upper end and a lower end; a plurality of teeth extending around the lower end of the body; the upper end of the body having an upwardly facing surface; the surface having a high point and a low point, a first section extending clockwise around the body from the low point to the high point, and a second section extending counterclockwise around the body from the low point to the high point;
   B) a plastic handle body molded around the insert, the handle having a grip and a base; the base including torque drive surfaces, each such surface engaging one of the first and second sections of the upper surface of the insert.

6. A hand lever assembly as described in claim 5 wherein the high point of the insert upper surface is opposed from the lower point of the insert upper surface.

7. A hand lever assembly as described in claim 5 where the insert is generally cylindrical.

8. A hand lever assembly as described in claim 5 where the insert upper surface in planar.

9. A hand lever assembly as described in claim 5 where the handle body grip extends radially from the handle body base parallel to the plane of the upper surface.

10. An insert adapted to be molded into a hand lever body, the insert having a hollow tubular body with an upper portion and a lower portion, the lower portion having a plurality of teeth for engaging complementary teeth on a rotary member, the upper portion of the insert having an upper surface, the upper surface including a high point, a low point, a first surface extending clockwise around the body from the low point to the high point, and a second surface extending counterclockwise around the body from the low point to the high point.

11. An insert as described in claim 10 where the insert body is generally cylindrical.

12. An insert as described in claim 10 where the upper surface of the insert is generally elliptical.

13. An insert as described in claim 10 where the upper surface of the insert is planar.

14. An insert as described in claim 10 where the teeth face inwardly.

15. An insert as described in claim 10 wherein the body is generally cylindrical and the upper surface is planar.

* * * * *